Figure 1:
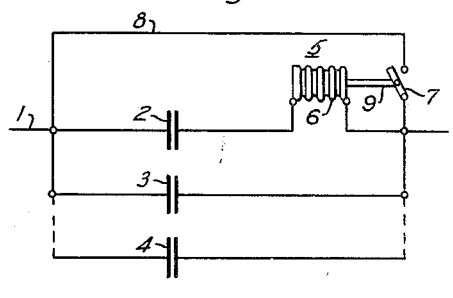

April 18, 1950  R. E. MARBURY  2,504,860
SERIES CAPACITOR PROTECTION
Filed July 20, 1946

WITNESSES:
N. F. Susser
F. P. Lyle

INVENTOR
Ralph E. Marbury.
BY O. B. Buchanan
ATTORNEY

Patented Apr. 18, 1950

2,504,860

UNITED STATES PATENT OFFICE 2,504,860

SERIES CAPACITOR PROTECTION

Ralph E. Marbury, Wilkinsburg, Pa., assignor to Westinghouse Electric Corporation, East Pittsburgh, Pa., a corporation of Pennsylvania Application July 20, 1946, Serial No. 685,058

16 Claims. (Cl. 175—294)

The present invention relates to series capacitor protection and, more particularly, to a protective system for series capacitors utilizing a thermally-responsive current-carrying protective device.

Series capacitors are connected in series in alternating-current distribution and transmission lines in order to neutralize part or all of the inductive reactance of the line, and thus to improve the voltage regulation or increase the stability limits of such lines. Since series capacitors are connected in series and carry the line current, the voltage across the capacitor is proportional to the line current, and the capacitor may be subjected to relatively high overvoltages in case of a fault, or an abnormal overload, on the line. It is not practical to utilize capacitors which are capable of withstanding the maximum voltage to which they may be subjected under fault conditions, because of their cost, and for this reason it is necessary to provide protective means for by-passing the capacitor upon the occurrence of an overvoltage.

Capacitor units of the type which are used as series capacitors are capable of withstanding voltages as high as 200% of the rated voltage for very brief periods, but cannot safely be subjected to higher voltages even momentarily. Protective systems for series capacitors, therefore, usually operate to by-pass the capacitor upon the occurrence of a voltage across the capacitor corresponding to 200% of the rated voltage of the capacitor units. The capacitor may be damaged, however, by a lower overvoltage if it persists for a sufficiently long time, and it is often desirable to provide protection for series capacitors against moderate overvoltages which last for a long enough time to be harmful to the capacitor, as well as substantially instantaneous protection against higher overvoltages.

A very effective protective device for series capacitors is disclosed and claimed in a copending application of R. E. Marbury and J. B. Owens, Serial No. 572,610, filed January 13, 1945, and assigned to the Westinghouse Electric Corporation. This device consists essentially of a metallic bellows, and a switching means actuated by the bellows and connected to complete a by-pass circuit around the protected capacitor. The bellows is connected to carry the line current and to be heated thereby, and is normally in a collapsed condition so as to hold the switching means open. Upon the occurrence of an excess current which heats the bellows to a predetermined temperature, the bellows expands, and operates, or permits operation of, the switching means to complete the bypass circuit.

A thermally-responsive device of this type inherently has inverse time-current characteristics, that is, it will operate more rapidly on high currents than on lower currents. This device, therefore, is very well suited for series capacitor protection, and the bellows can be connected in series with the capacitor to afford complete protection against moderate overvoltages, since it will permit such overvoltages to exist on the capacitor only for a limited time, the time being shorter for higher voltages than for lower overvoltages. In this way, the capacitor is not taken out of service unless the overvoltage lasts long enough to be dangerous, but it is positively protected against moderate overvoltages as well as against higher excess voltages.

If the maximum short-circuit current of the line is not too high, such an arrangement may be used alone, in connection with a capacitor which is capable of withstanding the voltage corresponding to the maximum short-circuit current for the brief time required for the bellows to operate at this current, since the extra cost of such a capacitor is offset by the simplicity and low cost of the protective equipment. If the maximum short-circuit current is too high, compared to the normal line current, additional instantaneous protection for higher overvoltages may be provided in the usual manner by means of a spark gap connected across the capacitor, preferably with a second bellows device in series with the gap to complete a bypass circuit in response to the gap current.

When a bellows device is connected in series with the capacitor, in the manner described above, and carries the capacitor current, its operating characteristics must be coordinated with the insulation characteristics of the capacitor, in order to provide proper protection, so that the bellows will always operate before an overvoltage becomes dangerous to the capacitor, but will not operate unnecessarily. Since the line currents and system characteristics differ widely in different series capacitor installations, this necessity for coordination of the bellows with the capacitor makes it necessary to have available a wide range of bellows devices having different current ratings, so that the proper bellows can be selected for each installation. This, of course, is highly undesirable since it requires a large number of different designs of bellows devices, having different wall thicknesses and dimensions, so as to have the necessary range of current ratings. In order to avoid this condition, it is desirable to provide an arrangement in which a single bellows device of standard current rating can be used in different series capacitor installations, so as to avoid the necessity of using a special bellows for each installation, thus making it possible to provide protective systems of this type for different series capacitor installations with the necessity of having available only one, or a very few, standard bellows devices of standardized current rating.

The principal object of the present invention is to provide a protective system for series capacitors utilizing a thermally-responsive current-carrying device, such as a bellows, to actuate a bypassing means, in which a bellows of standard current rating can be used in different series capacitor installations so that only one, or a very few, standard types of bellows having standardized current ratings are required.

A further object of the invention is to provide a series capacitor protective system utilizing a current-carrying bellows device to actuate a bypassing means, in which the bellows is connected in series with an impedance device, which may be a part of the series capacitor bank itself, or which may be some other suitable impedance device, so that the bellows carries only a part of the total line current, which can be adjusted by proper choice of the impedance device to permit the use of a bellows of standard current rating.

Another object of the invention is to provide a protective system for series capacitors utilizing a current-carrying bellows device to actuate a bypassing means, in which the series capacitor bank is divided into two or more parallel branches, with the bellows connected in series in one branch, so as to carry only a part of the total line current, which can be adjusted, by proper division of the capacitor bank into branches, to suit the current rating of the bellows.

A still further object of the invention is to provide a protective system for series capacitors utilizing a current-carrying bellows device to actuate a bypassing means, in which the bellows is connected in parallel with the capacitor, and an impedance device is connected in series with the bellows device to limit the current carried by the bellows to a value determined by its current rating, so that a standard bellows device can be used in different series capacitor installations, the impedance device being either a resistor or an inductive device, and preferably having non-linear characteristics, so that it has high impedance under normal conditions but relatively low impedance under excess-current conditions to permit a large increase in the current through the bellows to obtain rapid operation.

The invention will be more fully understood from the following detailed description, taken in connection with the accompanying drawing, in which Figures 1 through 4 are schematic diagrams showing alternative embodiments of the invention.

Figure 1 shows a series capacitor installation connected in series in an alternating-current line 1, which may be one phase conductor of a three-phase line, or one conductor of a single-phase line, or, in general, any alternating-current line in which it is desired to introduce series capacitance. The series capacitor itself consists of a bank of at least two capacitors 2 and 3 connected in parallel. If desired, one or more additional capacitors 4 may be connected in parallel to the capacitors 2 and 3 in order to obtain the desired reactance and kva. capacity for the complete bank, but in this embodiment of the invention, at least two parallel-connected capacitors are required. Each of the capacitors 2, 3, or 4 may consist of a single capacitor unit, or of any necessary number of individual capacitor units connected together in any suitable manner, and the term "capacitor" as used in the specification and claims is to be understood in this sense.

The series capacitor bank, consisting of the parallel-connected capacitors 2 and 3, and any additional capacitors 4 that may be used, is protected against overvoltages by means of a protective device 5. The protective device 5 is shown diagrammatically as being of the type described in the above-mentioned Marbury and Owens application, and consists of a bellows device 6 and a switch 7, which is actuated by the bellows device 6, and connected to complete a bypass circuit 8 around the entire capacitor bank when actuated to closed position.

The bellows device 6 is a metallic bellows capable of carrying current in order to be heated by the current. As more fully explained in the above-mentioned copending application, the bellows device 6 is substantially evacuated, and contains a small amount of a suitable liquid, such as water, which has a very low vapor pressure at temperatures corresponding to the current in the bellows under normal conditions, but which has a high enough vapor pressure to balance the atmospheric pressure and expand the bellows at a higher temperature at which operation of the bellows is desired. The bellows device 6 is connected to the switch 7 in any suitable manner, as by a mechanical linkage 9, to operate the switch, or to permit it to operate, to closed position when the bellows is expanded as a result of heating by an excess current. The bellows device 6 is connected in series with the capacitor 2, as shown, so that it carries only a part of the total line current, as determined by the relative reactances of the capacitor 2 and the parallel-connected capacitor or capacitors.

The operation of this system is as follows. Under normal conditions, the bellows 6, being substantially evacuated, is collapsed by atmospheric pressure, and the switch 7 is held open, so that the capacitor bank is in series in the line 1. The bellows 6, which is in series with the capacitor 2, carries only a predetermined portion of the total line current, and this portion of the current may be matched to the current rating of the bellows 6 by a proper choice of the capacitors 2 and 3, to divide the total line current between them in a proportion which will give the desired current in the bellows 6. Upon the occurrence of an excess current, the temperature of the bellows will be increased, and when it reaches a predetermined temperature, the vapor pressure of the liquid in the bellows becomes high enough to balance the external atmospheric pressure and expand the bellows, so that the switch 7 is closed to complete the bypass circuit 8 and thus protect the series capacitor bank.

Since the bellows 6 is also bypassed by the bypass circuit 8, current ceases to flow in it when the switch 7 closes, and the bellows commences to cool. An appreciable time is required for the bellows to cool down to its normal temperature, however, and this time is, in general, long enough for a fault or other disturbance on the line 1 to be cleared, so that when the bellows has cooled down sufficiently to be collapsed by atmospheric pressure and reopen the switch 7 to restore the capacitor bank to service, the overvoltage will usually have passed. In case the excess current should still exist, however, when the switch 7 opens, the bellows will immediately start heating again and operate to reclose the switch 7 in the same manner as before.

It will be seen, therefore, that a protective system is provided for series capacitor installations in which the capacitors are protected against dangerous overvoltages in a very simple and reliable manner, since the bellows 6 inherently has inverse time-current characteristics, which makes it possible to protect the capacitor against moderate overvoltages which can be permitted for a reasonable time, as well as against higher overvoltages which can be permitted only for a very brief time. By dividing the capacitor bank into at least two parallel branches, with the bellows device 6 in series with one of the branches, so as to carry only a portion of the total line current, it is possible to use a standard bellows 6, having a standardized current rating, in different series capacitor installations, since by properly proportioning the relative reactances of the parallel branches of the bank, the current in the branch in which the bellows is connected can be matched to the current rating of the bellows. Thus, the same bellows can be used in different series capacitor installations, even though the line currents and other conditions differ widely. In this way, the necessity of providing a large number of different bellows of different current ratings is avoided, and protective systems of this type can be provided for different installations with a single type of bellows of standard current rating.

The simple protective system described may be used alone where the maximum short-circuit current of the line is not too great as compared with the normal full-load current. If the maximum short-circuit current is not more than three times the normal current, for example, the capacitor can be designed to withstand the corresponding overvoltage for the brief time required for operation of the bellows at that value of current, and the resulting increased cost of the capacitor is offset by the low cost and simplicity of the protective equipment. Where higher short-circuit currents may occur, additional instantaneous protection against high overvoltages may be provided by means of a spark gap, or in any suitable manner.

Figure 2:
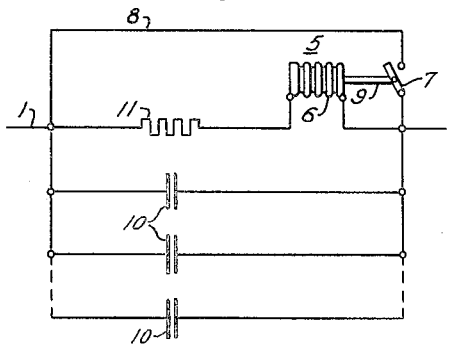

Another embodiment of the invention is shown in Fig. 2. This embodiment of the invention utilizes the same basic idea of connecting the bellows in series with an impedance element in parallel with the capacitor bank, so that the bellows carries only a predetermined part of the total current, which can thus be adjusted to match the current rating of the bellows. Fig. 2 shows a capacitor bank consisting of any suitable number of parallel-connected capacitors 10, connected in series in the line 1, and protected by a protective device 5 identical with that described above in connection with Fig. 1. In this embodiment of the invention, however, the bellows 6 is connected in series with a resistor 11, the series-connected bellows 6 and resistor 11 being connected in parallel with the capacitors 10. It will be seen that with this arrangement, the bellows 6 carries only a predetermined part of the line current which, by suitable choice of the resistor 11, can be adjusted to match the current rating of the bellows.

The resistor 11 may be of any suitable type, but preferably is of the so-called non-linear type,
in which the effective resistance of the resistor decreases with increase in current or voltage above a certain critical value. Such resistors are well known in themselves, and may consist, for example, of granular silicon carbide molded to the desired size and shape with a suitable binder, such as sodium silicate, and baked. Resistors of this type have relatively high resistance under low voltages, but when the voltage across the resistor, or the current through it, exceeds a certain critical value, the effective resistance rapidly decreases and permits heavy currents to flow.

By using a resistor of this type in series with the bellows 6, it is possible to limit the current through the bellows under normal conditions to a relatively low value, and the effectiveness of the series capacitor in the line 1 is not significantly affected by the high-resistance shunt consisting of the resistor 11 and bellows 6. Upon the occurrence of a fault on the line 1, or other abnormal condition, causing an excess current to flow, the effective resistance of the resistor 11 decreases, permitting a larger proportion of the current to flow through the bellows 6 and rapidly heating it to the temperature at which it operates to bypass the series capacitor. Thus, in this embodiment of the invention, effective and rapid protection of the series capacitor is obtained, and it also has the same advantage as the embodiment previously described of permitting the use of a standard bellows in different series capacitor installations, so that it is only necessary to have available one, or at most a very few, different types of bellows of standardized current ratings.

Figure 3:
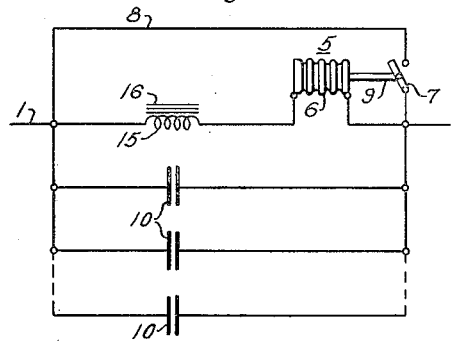

A much sharper increase in the current through the bellows, upon the occurrence of an excess current in the line, can be obtained by the use of a saturable, iron-core reaction in series with the bellows, as shown in Fig. 3. The embodiment of the invention shown in this figure is identical with that of Fig. 2 except that the non-linear resistor is replaced by a reactor 15, having a saturable iron core 16. The reactor 15 is designed so that it is substantially unsaturated under normal conditions and has relatively high impedance to limit the current through the bellows 6 to a relatively small value, which is matched to the current rating of the bellows. When an excess current occurs in the line 1, the increased current in the reactor 15 causes its core 16 to saturate, resulting in a large decrease in the impedance of the reactor and a sharp increase in the current through the bellows 6, so that rapid operation of the bellows is obtained. Thus, this embodiment of the invention has the same advantages as that of Fig. 2, but gives a much sharper increase in the bellows current under excess-current conditions than can be obtained with a non-linear resistor.

Figure 4:
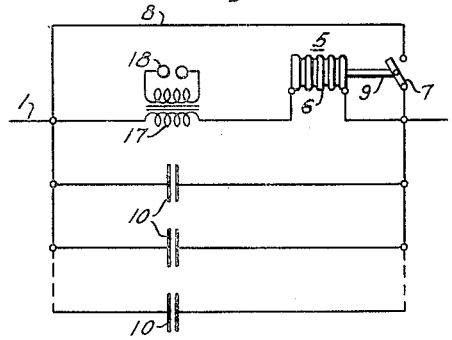

Another type of non-linear impedance device which may be used to control the bellows current is shown in Fig. 4. In this embodiment of the invention, the bellows 6 is connected across the series capacitor bank in the same manner as in Figs. 2 and 3. The primary winding of a transformer 17 is connected in series with the bellows 6, and a spark gap 18 is connected across the secondary winding of the transformer 17. Under normal conditions, with the secondary winding of the transformer 17 open-circuited, the impedance of the transformer is quite high and limits the bellows current to a small value. Upon the occurrence of an excess current in the line 1, the voltage across the secondary winding of the transformer 17 increases, and the spark gap 18 breaks down, short-circuiting the secondary winding. This causes a large decrease in the effective impedance of the transformer 17, and results in a sharp increase in the bellows current and rapid operation of the bellows.

It will now be apparent that a protective system for series capacitors has been provided utilizing the thermally-responsive protective device disclosed in the above-mentioned Marbury and Owens application, in which the same bellows can be used in different installations, so that the difficulty of coordinating the bellows device with the capacitor characteristics in different installations is avoided, and a standard bellows device can be used in series capacitor installations under widely varying conditions. In the embodiments of the invention shown in Figs. 2, 3 and 4, very rapid operation of the bellows is obtained by the use of non-linear impedance devices which permit the current in the bellows to increase more rapidly than the line current. It will be apparent that the invention is capable of various other embodiments and modifications. Thus, any suitable type of non-linear impedance device may be used, and if it is desired to provide instantaneous protection against higher overvoltages which cannot be permitted to occur across the capacitor even momentarily, a spark gap device may be connected across the capacitor bank in any of the embodiments shown, and any suitable means for by-passing the gap and capacitor may be provided in addition to the protective device 5, if desired.

It is to be understood, therefore, that although certain illustrative embodiments of the invention have been shown and described, it is not limited to the specific arrangements shown, but in its broadest aspects, it includes all equivalent embodiments and modifications which come within the scope of the appended claims.

I claim as my invention:

1. A series capacitor installation for an alternating-current line, said installation comprising at least two parallel-connected capacitors adapted to be connected in series in said line, and protective means for said capacitors, said protective means including a thermally-responsive device and switching means actuated by said thermally-responsive device, said switching means being connected to complete a bypass circuit around the capacitors when actuated by the thermally-responsive device, and the thermally-responsive device being connected in series with one of said parallel-connected capacitors to be heated by a predetermined part of the line current.

2. A series capacitor installation for an alternating-current line, said installation comprising at least two parallel-connected capacitors adapted to be connected in series in said line, and protective means for said capacitors, said protective means including a bellows device adapted to carry current and to be heated thereby, switching means actuated by said bellows device, said switching means being connected to complete a bypass circuit around the capacitor when actuated by the bellows device, and the bellows device being connected in series with one of said parallel-connected capacitors to carry a predetermined part of the line current.

3. A series capacitor installation for an alternating-current line, said installation comprising a capacitor adapted to be connected in series in said line, and protective means for said capacitor, said protective means including a thermally-responsive device, switching means actuated by said thermally-responsive device, said switching means being connected to complete a bypass circuit around the capacitor when actuated by the thermally-responsive device, and an impedance device connected in series with the thermally-responsive device, said impedance device being of a type in which the effective impedance decreases when the current increases, and said series-connected impedance device and thermally-responsive device being connected in parallel with the capacitor to carry a predetermined part of the line current.

4. A series capacitor installation for an alternating-current line, said installation comprising a capacitor adapted to be connected in series in said line, and protective means for said capacitor, said protective means including a bellows device adapted to carry current and to be heated thereby, switching means actuated by said bellows device, said switching means being connected to complete a bypass circuit around the capacitor when actuated by the bellows device, and an impedance device connected in series with the bellows device, said impedance device being of a type in which the effective impedance decreases when the current increases, and said series-connected impedance device and bellows device being connected in parallel with the capacitor to carry a predetermined part of the line current.

5. A series capacitor installation for an alternating-current line, said installation comprising a capacitor adapted to be connected in series in said line, and protective means for said capacitor, said protective means including a thermally-responsive device, switching means actuated by said thermally-responsive device, said switching means being connected to complete a bypass circuit around the capacitor when actuated by the thermally-responsive device, and a resistor connected in series with the thermally-responsive device, said resistor being of a type in which the effective resistance decreases as the current increases, and said resistor and thermally-responsive device being connected in parallel with the capacitor to carry a predetermined part of the line current.

6. A series capacitor installation for an alternating-current line, said installation comprising a capacitor adapted to be connected in series in said line, and protective means for said capacitor, said protective means including a bellows device adapted to carry current and to be heated thereby, switching means actuated by said bellows device, said switching means being connected to complete a bypass circuit around the capacitor when actuated by the bellows device, and a resistor connected in series with the bellows device, said resistor being of a type in which the effective resistance decreases as the current increases, and said resistor and bellows device being connected in parallel with the capacitor to carry a predetermined part of the line current.

7. A series capacitor installation for an alternating-current line, said installation comprising a capacitor adapted to be connected in series in said line, and protective means for said capacitor, said protective means including a thermally-responsive device, switching means actuated by said thermally-responsive device, said switching means being connected to complete a by-pass circuit around the capacitor when actuated by the thermally-responsive device, and an inductive impedance device connected in series with the thermally-responsive device, said impedance device being of a type in which the effective impedance decreases under excess-current conditions, and said series-connected impedance device, and thermally-responsive device being connected in parallel with the capacitor to carry a predetermined part of the line current.

8. A series capacitor installation for an alternating-current line, said installation comprising a capacitor adapted to be connected in series in said line, and protective means for said capacitor, said protective means including a thermally-responsive device, switching means actuated by said thermally-responsive device, said switching means being connected to complete a bypass circuit around the capacitor when actuated by the thermally-responsive device, and a saturable iron-core reactor connected in series with the thermally-responsive device, said reactor being adapted to saturate and reduce its impedance under excess-current conditions, and said series-connected reactor and thermally-responsive device being connected in parallel with the capacitor to carry a predetermined part of the line current.

9. A series capacitor installation for an alternating-current line, said installation comprising a capacitor adapted to be connected in series in said line, and protective means for said capacitor, said protective means including a conductive thermally-responsive device having inverse time-current characteristics, said thermally-responsive device being adapted to carry current and to be heated solely thereby, an impedance device connected in series with the thermally-responsive device, means for connecting said impedance device and thermally-responsive device in series with the line to carry a predetermined part of the line current, and switching means actuated by the thermally-responsive device, said switching means being connected to complete a bypass circuit around the capacitor when actuated, and the thermally-responsive device being adapted to effect interruption of the bypass circuit after lapse of a time interval after actuation of the switching means.

10. A series capacitor installation for an alternating-current line, said installation comprising a capacitor adapted to be connected in series in said line, and protective means for said capacitor, said protective means including a conductive thermally-responsive device having inverse time-current characteristics, said thermally-responsive device being adapted to carry current and to be heated solely thereby, an impedance device connected in series with the thermally-responsive device, means for connecting said impedance device and thermally-responsive device in series with the line to carry a predetermined part of the line current, and switching means actuated by the thermally-responsive device, said switching means being connected to complete a by-pass circuit around the capacitor and the thermally-responsive device when actuated, whereby current flow through the thermally-responsive device substantially ceases, and the thermally-responsive device being adapted to effect interruption of the bypass circuit upon cooling due to the cessation of current flow.

11. A series capacitor installation for an alternating-current line, said installation comprising a capacitor bank adapted to be connected in series in said line, and protective means for said capacitor bank, said protective means including a conductive thermally-responsive device having inverse time-current characteristics, said thermally-responsive device being adapted to carry current and to be heated solely thereby, an impedance device connected in series with the thermally-responsive device, means for connecting said impedance device and thermally-responsive device in parallel with at least a part of the capacitor bank to carry a predetermined part of the line current, and switching means actuated by the thermally-responsive device, said switching means being connected to complete a bypass circuit around the capacitor bank when actuated, and the thermally-responsive device being adapted to effect interruption of the bypass circuit after lapse of a time interval after actuation of the switching means.

12. A series capacitor installation for an alternating-current line, said installation comprising a capacitor bank adapted to be connected in series in said line, and protective means for said capacitor bank, said protective means including a conductive thermally-responsive device having inverse time-current characteristics, said thermally-responsive device being adapted to carry current and to be heated solely thereby, an impedance device connected in series with the thermally-responsive device, means for connecting said impedance device and thermally-responsive device in parallel with at least a part of the capacitor bank to carry a predetermined part of the line current, and switching means actuated by the thermally-responsive device, said switching means being connected to complete a bypass circuit around the capacitor bank and the thermally-responsive device when actuated, whereby current flow through the thermally-responsive device substantially ceases, and the thermally-responsive device being adapted to effect interruption of the bypass circuit upon cooling due to the cessation of current flow.

13. Protective means for a capacitor connected in series in an alternating-current line, said protective means including a conductive thermally-responsive device having inverse time-current characteristics, said thermally-responsive device being adapted to carry current and to be heated solely thereby, an impedance device connected in series with the thermally-responsive device, means for connecting said impedance device and thermally-responsive device in series with the line to carry a predetermined part of the line current, and switching means actuated by the thermally-responsive device, said switching means being connected to complete a bypass circuit around the capacitor when actuated, and the thermally-responsive device being adapted to effect interruption of the bypass circuit after lapse of a time interval after actuation of the switching means.

14. Protective means for a capacitor bank connected in series in an alternating-current line, said protective means including a conductive thermally-responsive device having inverse time-current characteristics, said thermally-responsive device being adapted to carry current and to be heated solely thereby, an impedance device connected in series with the thermally-responsive device, means for connecting said impedance device and thermally-responsive device in parallel with at least a part of the capacitor bank to carry a predetermined part of the line current, and switching means actuated by the thermally-responsive device, said switching means being connected to complete a bypass circuit around the capacitor bank when actuated, and the thermally-responsive device being adapted to effect interruption of the bypass circuit after lapse of a time interval after actuation of the switching means.

15. A series capacitor installation for an alternating-current line, said installation comprising a capacitor adapted to be connected in series in said line, and protective means for said capacitor, said protective means including a conductive bellows device adapted to carry current and to be heated solely thereby, an impedance device connected in series with said bellows device, means for connecting the said impedance device and bellows device in series with the line to carry a predetermined part of the line current, and switching means actuated by the bellows device, said switching means being connected to complete a bypass circuit around the capacitor when actuated by expansion of the bellows in response to heating by an excessive current, and the bellows device being adapted to effect interruption of the bypass circuit when the bellows device cools.

16. A series capacitor installation for an alternating-current line, said installation comprising a capacitor bank adapted to be connected in series in said line, and protective means for said capacitor bank, said protective means including a conductive bellows device adapted to carry current and to be heated solely thereby, an impedance device connected in series with said bellows device, means for connecting the said impedance device and bellows device in parallel with at least a part of the capacitor bank to carry a predetermined part of the line current, and switching means actuated by the bellows device, said switching means being connected to complete a bypass circuit around the capacitor bank when actuated by expansion of the bellows in response to heating by an excessive current, and the bellows device being adapted to effect interruption of the bypass circuit when the bellows device cools.

RALPH E. MARBURY.

REFERENCES CITED

The following references are of record in the file of this patent:

UNITED STATES PATENTS

| Number | Name | Date |
| --- | --- | --- |
| 707,894 | Andrews | Aug. 26, 1902 |
| 1,718,980 | Ringwald | July 2, 1929 |
| 2,157,886 | Cuttino | May 9, 1939 |
| 2,202,715 | Partington | May 28, 1940 |
| 2,202,716 | Partington | May 28, 1940 |
| 2,323,720 | Marbury et al. | July 6, 1943 |

FOREIGN PATENTS

| Number | Country | Date |
| --- | --- | --- |
| 213,121 | Switzerland | Apr. 16, 1941 |